United States Patent [19]
Wright

[11] 3,852,324
[45] Dec. 3, 1974

[54] N,N-(CYANO-PHENYLENE) DIOXAMIC ACIDS

[75] Inventor: John B. Wright, Kalamazoo, Mich.

[73] Assignee: The Upjohn Company, Kalamazoo, Mich.

[22] Filed: Dec. 20, 1972

[21] Appl. No.: 316,975

[52] U.S. Cl. ............................ 260/465 D, 424/304
[51] Int. Cl. .......................................... C07c 121/78
[58] Field of Search ............................... 260/465 D

[56] References Cited
OTHER PUBLICATIONS
Aba Ltd: Chemical Abstracts, Vol. 72, p. 305 (1970).
Aba Ltd: Chemical Abstracts, Vol. 71, p. 346 (1969).

*Primary Examiner*—Lewis Gotts
*Assistant Examiner*—Dolph H. Torrence
*Attorney, Agent, or Firm*—Martin B. Barancik; Roman Saliwanchik

[57] ABSTRACT

Compounds represented below

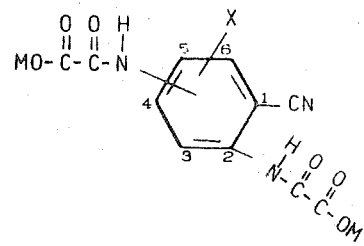

and pharmaceutical compositions thereof are useful in the prophylactic treatment of sensitized humans and animals for allergy and all anaphylactic reactions of a reagin or non-reagin mediated nature.

7 Claims, No Drawings

N,N-(CYANO-PHENYLENE) DIOXAMIC ACIDS

BRIEF SUMMARY OF THE INVENTION

It has now been discovered that novel compounds of Formula I are useful in the prophylactic treatment of sensitized humans and animals for allergy and all anaphylactic reactions of a reagin or non-reagin mediated nature. The compounds are formulated with pharmaceutical carriers for oral, parenteral, inhalation, or rectal means of administration.

DETAILED DESCRIPTION OF THE INVENTION

In accordance with the invention is provided compounds represented by FIG. I

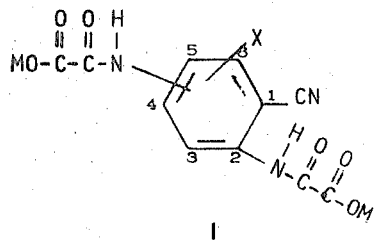

wherein M is hydrogen or a pharmaceutically acceptable metal or an amine cation and

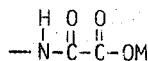

is at one of the positions 4, 5 and 6 with the proviso that where

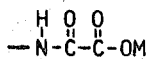

is at 4, then when X is at the 3 position, X is selected from the group consisting of hydrogen and alkyl from one to three carbon atoms, inclusive;
when X is at the 5 position, X is selected from the group consisting of hydrogen, halogen, alkoxy from one to three carbon atoms, inclusive, and cyano; and
when X is at the 6 position, X is selected from the group consisting of hydrogen and halogen;

5, then when X is at the 3 or 6 position, X is hydrogen, and
X is at the 4 position, X is selected from the group consisting of hydrogen, halogen, alkyl from one to three carbon atoms, inclusive; and alkoxy from one to three carbon atoms, inclusive;

6, when X is at the 3 or 5 position, X is selected from the group consisting of hydrogen and alkyl from one to three carbon atoms, inclusive; and
X is at the 4 position, X is selected from the group consisting of hydrogen, alkyl from one to three carbon atoms, inclusive, and cyano.

The preferred compounds are those compounds where M is hydrogen or tris(hydroxymethyl)methylammonium,

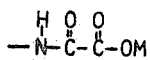

is at the 4 or 5 position and X is hydrogen.

As employed in the above disclosure and throughout the specification, the term "halogen" includes fluoro, chloro, bromo, and iodo and the term "alkyl" includes methyl, ethyl, propyl, and isopropyl when limited to three carbon atoms. The term "a pharmaceutically acceptable metal or amine cation" includes alkali metals such as sodium and potassium, alkaline earth metals such as calcium and magnesium, other acceptable metals such as aluminum, and amine cations. The term "amine cation" includes all pharmaceutically acceptable amine cations, including, for example, cations of ammonia, tris(hydroxymethyl)aminomethane, D-threo-2-amino-1-p-nitrophenyl-1,3-propanediol, N,N-bis(hydroxyethyl)piperazine, 2-amino-2-methyl-1-propanol, 2-amino-2-methyl-1,3-propanediol and 2,2-bis(hydroxymethyl)-2,2',2''-nitriolotriethanol and further amines including $H_2NR'$, $HNR'_2$, and $NR'_3$, wherein R' is selected from the group consisting of alkyl from one to three carbon atoms, inclusive, and $-CH_2CH_2OH$.

The compounds of this invention can be prepared by methods known to the art. Diamino substituted benzonitriles with X in appropriate position (ii) are suitable starting materials. These compounds are reacted with ethyloxalyl chloride (iii) or other alkyl oxalyl halide in suitable solvent and base to form the dioxamate (IV).

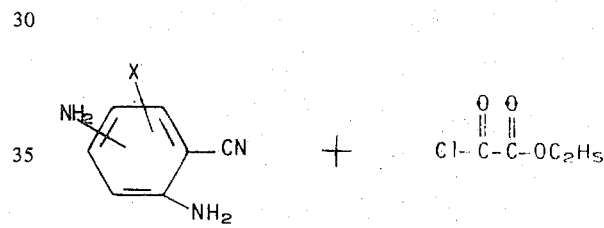

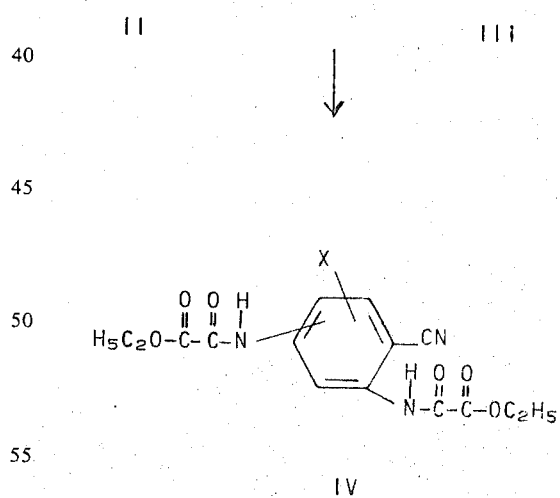

Thereafter, the dioxamate is converted to the diacid by hydrolysis and thence to the metal or amine salts by standard methods.

Examples of known starting material precursors include 2,6-dinitro-4-methylbenzonitrile; 5-chloro-2,4-dinitrobenzonitrile; 2-chloro-4,6-dinitrobenzonitrile; and 2,4-dinitro-m-toluinitrile, which can be readily reduced to the corresponding diamino compound. Other starting materials are conveniently prepared by known methods. For example, appropriately X-substituted dinitro benzoic acids can be converted to the analogous cyano compound and then reduced to analogous diamino compounds. The conversion of the acid to the nitrile is readily accomplished by step-wise treatment of the acid with thionyl chloride, ammonia, and phosphorous pentoxide. The reduction of nitro to amino is easily effected by catalytic means such as Raney Nickel, palladium on charcoal or platinum in the presence of hydrogen. Additionally, conventional chemical means are also available for reduction of a nitro grouping to an amine grouping, for example, stannous chloride in concentrated hydrochloric acid and iron in acetic acid and ethanol.

Examples of suitable starting material precursors and/or the method of preparing them are the following: m-alkylbenzoic acid is nitrated with nitric acid to make 2,6-dinitro-3-alkylbenzoic acid and 2,4-dinitro-3-alkylbenzoic acid which are readily separated by chromatography. The carboxy group is converted to cyano by methods previously disclosed above and the nitro groups reduced to amino by one of the aforementioned methods to make 2,6-diamino-3-alkylbenzonitrile and 2,4-diamino-3-alkylbenzonitrile. Alternatively m-halo, preferably fluoro or chloro, benzoic acid can be nitrated to form 2,4-dinitro-5-halo-benzoic acid. This compound can either be reduced to the corresponding diaminobenzonitrile or substituted at the 5-position with alkoxy by subjecting the 2,4-dinitro-4-halobenzoic acid to alkanol attack in a strong base such as KOH. The product of such treatment is 2,4-dinitro-5-alkoxybenzoic acid which is then reduced to the 2,4-diamino-5-alkoxybenzonitrile.

2,5-diamino-4-substituted benzonitriles are prepared in the following manner. Where the substitution is alkyl, the 2-nitro-4-alkylbenzoic acid is converted to the corresponding benzonitrile and then reduced to the corresponding aminobenzonitrile. The resulting 2-amino-4-alkylbenzonitrile is then nitrated with nitric acid to the 2-amino-4-alkyl-5-nitrobenzonitrile which is separated from its isomer by chromatography and reduced to the 2,5-diamino-4-alkylbenzonitrile. In a similar manner, 2,5-diamino-4-halobenzonitrile and the 2,5-diamino-4-alkoxybenzonitrile compounds are prepared from 2-nitro-4-halobenzoic acid and 2-nitro-4-alkoxybenzoic acid precursors respectively.

Once starting material II is prepared, it is reacted with an alkyl oxalyl halide, for example, ethyloxalyl halide to form the oxamate. This reaction is carried out in base and solvent at standard conditions. Examples of suitable solvents are dimethylformamide, dioxane, and tetrahydrofuran. Appropriate bases include triethylamine, N-methylmorpholine, dimethylpiperazine, and N-methylpiperidine.

The dioxamate is then readily converted to the dioxamic acid by using dilute base such as sodium hydroxide, potassium hydroxide, or potassium carbonate at temperatures ranging from about 25° to about 100°C. The acid can then be easily converted to the metal or amine salt by contacting the diacid with two equivalents of the desired amine or metal hydroxide and heating in a sufficient amount of water to effect solubilization. The crystalline salts can be precipitated by the addition of methanol.

Following is an illustrative list of compounds of the invention which can be prepared by the above disclosed procedures:

TABLE I

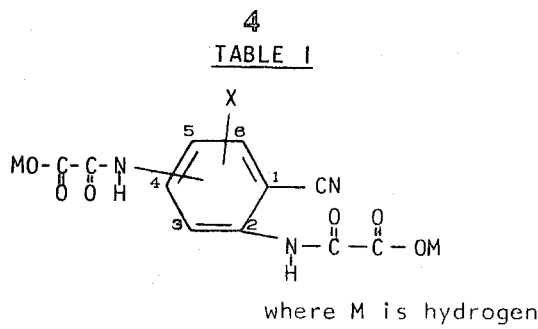

where M is hydrogen

| X and Ring Position | Ring Position of $-\underset{H}{N}-\underset{O}{\overset{O}{C}}-\underset{O}{\overset{O}{C}}-OM$ |
|---|---|
| 3H | 4 |
| 3CH₃ | 4 |
| 3C₃H₇ | 4 |
| 5F | 4 |
| 5Cl | 4 |
| 5OC₂H₅ | 4 |
| 5OiC₃H₇ | 4 |
| 5CN | 4 |
| 6F | 4 |
| 6Cl | 4 |
| 3H | 5 |
| 4F | 5 |
| 4Cl | 5 |
| 4CH₃ | 5 |
| 4C₃H₇ | 5 |
| 4OCH₃ | 5 |
| 4OiC₃H₇ | 5 |
| 3H | 6 |
| 4CN | 6 |
| 3C₂H₅ | 6 |
| 5C₃H₇ | 6 |
| 4CH₃ | 6 |

TABLE II

The compounds of Table I are converted to pharmaceutically acceptable metal and amine cations by standard methods, for example, tris(hydroxymethyl)-aminomethane.

The Table II is not rendered in the same manner as Table I for the purpose of brevity; however, the same scoping is intended.

The following examples are compounds in accordance with this invention. The compounds are intended not to limit but merely to exemplify the invention.

Example 1 N,N'-(4-Cyano-m-phenylene)dioxamic acid a. 2,4-dinitrobenzonitrile

A mixture of 21.2 grams (0.1 mole) of 2,4-dimitrobenzoic acid and 32.0 grams (0.21 mole) of benzenesulfonamide is stirred and heated in an oil bath at 205°–210° for 1 hour and then at 225° for 1 hour and allowed to cool to room temperature under a nitrogen atmosphere. The residue is shaken with methylene chloride and dilute NaOH solution and the methylene chloride layer separated and washed with water. The solvent is removed by distillation. There is obtained 6.05 grams (31%) of material melting at 88°–92°. Recrystallization from ethanol raises the melting point to 100°–2°. The infrared spectrum shows a weak nitrile band at 2,200 cm$^{-1}$.

b. 2,4-Diaminobenzonitrile

To a stirred solution of 45.12 grams (0.2 moles) of stannous chloride dihydrate in 100 ml. of concentrated HCl is added, gradually, 5.44 grams (0.0282 moles) of 2,4-dinitrobenzonitrile. An exothermic reaction takes place with the temperature rising to about 80°. The solution is stirred and allowed to come to room temperature over the course of two hours. The mixture is made strongly basic by the addition of a 50% sodium hydroxide solution, with cooling, and extracted with methylene chloride. The CH$_2$Cl$_2$ extracts are dried over anhydrous MgSO$_4$ and the solvent removed. There is obtained 3.0 grams (80%) of a yellow solid melting at 102°–3°. Infrared (mull): 3500, 3350, (NH), 2200 (CN) cm$^{-1}$.

Anal. Calcd. for: C$_7$H$_7$N$_3$
   C, 63.14; H, 5.30; N, 31.56%
Found: C, 62.98, H, 5.35; N, 31.27% c. Dimethyl N,N'-(4 Cyano-m-phenylene)-dioxamate

A mixture of 29.0 grams (0.218 mole) of 2,4-diaminobenzonitrile and 255 grams of dimethyl oxalate is refluxed for 3 hours. The excess dimethyl oxalate is distilled off in vacuo. The residue is boiled with 150 ml. of methanol and filtered. The filtrate is poured into 900 ml. of water and the tan precipitate removed by filtration. There is obtained 53.7 grams (81%) of tan needles melting at 155°–160°. The product is boiled in 1,800 ml. of methanol and the insoluble material removed by filtration. The filtrate is poured into two liters of water, refrigerated, and the precipitate removed by filtration. There is obtained 23.8 grams of fine yellow needles melting at 160°–163°.

Anal. Calcd. for: C$_{13}$H$_{11}$N$_3$O$_6$
   C, 51.15; H, 3.63
Found: C, 51.69; H, 3.69
The infrared and NMR spectra are in agreement.

d. Product

A solution of 1.00 gram (0.0033 mole) of dimethyl N,N'-(4 cyano-m-phenylene)dioxamate in 50 ml. of methylene chloride is placed in a separatory funnel. The organic phase is extracted with 43 ml. of a 5% sodium hydroxide solution for ten minutes. The phases are separated and the aqueous phase acidified with dilute hydrochloric acid. The precipitate is removed by filtration. There is obtained 0.62 gram of a yellow material (68%) melting at 241° (dec.).

Anal. Calcd. for: C$_{11}$H$_7$N$_3$O$_6$
   C, 47.66; H, 2.55; N, 15.16
Found: C, 46.28; H, 2.47; N, 15.00
The infrared and NMR spectra are in agreement.

Example 2 N,N'-(2-Cyano-p-phenylene)dioxamic acid a. 2,5-Diaminobenzonitrile

To a solution of 80 grams (0.356 mole) of stannous chloride dihydrate in 200 ml. of concentrated hydrochloric acid is added in portions over the course of about 5 minutes, 16.314 grams (0.1 mole) of 5-nitroanthranilonitrile. Water cooling is used and the internal temperature rises to about 50°. Stirring is continued for 4 hours and the mixture is allowed to stand overnight. The reaction mixture is cooled to 5° in an ice-bath and a cold 50% solution of sodium hydroxide added until the mixture is strongly basic. The mixture is extracted with methylene chloride. The methylene chloride extracts are washed with water and the solvent removed by distillation. There is obtained 11.51 grams (86.5%) of material melting at 85°–87°. Recrystallization from benzene-skellysolve B gives material melting at 86°–7°. The infrared spectrum is in agreement.

b. Diethyl N,N'(2-Cyano-p-phenylene)-dioxamate

To a solution of 13.4 grams (0.112 mole) of 2,5-diaminobenzonitrile and 22.6 grams of triethylamine in 245 ml. of dimethylformamide, cooled to 5°, is added, dropwise, 30.5 grams of ethyl oxalyl chloride. The temperature is kept below 8°. The mixture is stirred in an ice-bath for 2 hours and allowed to stand overnight. The precipitate is removed by filtration and the filtrate poured into 1,500 ml. of water. The resulting precipitate is removed by filtration and recrystallized from ethanol. There is obtained 33.1 grams (89%) of cream needles melting at 140°–141°.

Anal. Calcd. for: C$_{15}$H$_{15}$N$_3$O$_6$
   C, 54.05; H, 4.54; N, 12.61%
Found: C, 54.39; H, 4.62; N, 12.80% c. Product

A solution of 5.00 grams (0.015 mole) of diethyl N,N'-(2-cyano-p-phenylene)dioxamate in 210 ml. of a 5% sodium hydroxide solution is stirred for 20 minutes at room temperature. The solution is extracted with methylene chloride. The aqueous solution is separated and acidified with dilute HCl. The precipitate is removed by filtration and washed with water. There is obtained 3.11 grams of material melting at 210° (dec.)

Anal. Calcd. for: C$_{11}$H$_7$N$_3$O$_6$
   C, 47.66; H, 2.55; N, 15.16%
Found: C, 47.07; H, 2.77; N, 15.44%
The infrared and NMR spectra are in agreement.

The compositions of the present invention are presented for administration to humans and animals in unit dosage forms, such as tablets, capsules, pills, powders, granules, sterile parenteral solutions or suspensions, eye drops, oral solutions or suspensions, and oil-in-water and water-in-oil emulsions containing suitable quantities of the compound of Formula I. The preferred method of administration is by inhalation into the lung by means of an aerosol liquid or powder for insufflation.

For oral administration, either solid or fluid unit dosage forms can be prepared. For preparing solid compositions such as tablets, the compound of Formula I is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Capsules are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydroalcoholic (ethanol) vehicle with suitable sweeteners such as sugar and saccharin, together with an aromatic flavoring agent.

Suspensions can be prepared with an aqueous vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into a suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

Additionally, a rectal suppository can be employed to deliver the active compound. This dosage form is of particular interest where the mammal cannot be treated conveniently by means of other dosage forms, such as orally or insufflation, as in the case of young children or debilitated persons. The active compound can be incorporated into any of the known suppository bases by methods known in the art. Examples of such bases include cocoa butter, polyethylene glycols (Carbowaxes), polyethylene sorbitan monostearate, and mixtures of these with other compatible materials to modify the melting point or dissolution rate. These rectal suppositories can weigh from about 1 to 2.5 Gm.

The preferred compositions are those adapted for inhalation into the lung and containing a compound of the invention which is water-soluble. For treatment of allergic conditions of the nose, such as rhinitis, compositions adapted for contact with nasal linings are preferred.

Compositions for inhalation are of three basic types: (1) a powder mixture preferably micropulverized with particle size preferably from about 1 to about 5 microns; (2) an aqueous solution to be sprayed with a nebulizer; and (3) an aerosol with volatile propellant in a pressurized container.

The powders are quite simply prepared by mixing a compound of the formula with a solid base which is compatible with lung tissue, preferably lactose. The powders are packaged in a device adapted to emit a measured amount of powder when inhaled through the mouth.

Aqueous solutions are prepared by dissolving the compound of the Formula I in water and adding salt to provide an isotonic solution and buffering to a pH compatible with inhalation. The solutions are dispersed in a spray device or nebulizer and sprayed into the mouth while inhaling.

Aerosols are prepared by dissolving a compound of the Formula I in water or ethanol and mixing with a volatile propellant and placing in a pressurized container having a metering valve to release a predetermined amount of material.

The liquefied propellant employed is one which has a boiling point below 65°F. at atmospheric pressure. For use in compositions intended to produce aerosols for medicinal use, the liquefied propellant should be nontoxic. Among the suitable liquefied propellants which may be employed are the lower alkanes containing up to five carbon atoms, such as butane and pentane, or a lower alkyl chloride, such as methyl, ethyl, or propyl, chlorides. Further suitable liquefied propellants are the fluorinated and fluorochlorinated lower alkanes such as are sold under the trademarks "Freon" and "Genetron." Mixtures of the above-mentioned propellants may suitable be employed. Examples of these propellants are dichlorodifluoromethane ("Freon 12"), dichlorotetrafluoroethane ("Freon 114"), trichloromonofluoromethane ("Freon 11"), dichloromonofluoromethane ("Freon 21"), monochlorodifluoromethane ("Freon 22"), trichlorotrifluoroethane ("Freon 113"), difluoroethane ("Genetron 142-A") and monochlorotrifluoromethane ("Freon 13").

The term "unit dosage form", as used in the specification and claims, refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular effect to be achieved and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, wafers, granules, cachets, teaspoonfuls, tablespoonfuls, dropperfuls, ampuls, vials, aerosols with metered discharges, segregated multiples of any of the foregoing, and other forms as herein described.

An effective but non-toxic quantity of the compound is employed in treatment. The dosage of the compound for treatment depends on the route of administration and the potency of the particular compound. A dosage schedule for humans of from about 0.2 to about 200 mg. of compound in a single dose, administered parenterally or by inhalation in the compositions of this invention, are effective for preventing allergy attacks. More specifically, the single dose is from about 1.0 to about 20 mg. of compound. The oral and rectal dose is from about 10 to about 400 mg. in a single dose. More specifically, the single dose is from about 20 to about 100 mg. of compound. The dosage to be administered can be repeated up to four times daily. However, when it is necessary to repeat treatment, a preferred dosage schedule reduces the secondary treatment dosage to from about 0.5 percent to about 20 percent of the above dosages, more specifically, from about 1 to about 10 percent of the above dosages. In this manner, a state of allergy prophylaxis can be maintained. The reduced dosage is taken until that dosage no longer provides effective protection. At that time, the larger dosage is repeated, followed by the reduced dosage. An example of such a dosage schedule is the following: An asthmatic individual insufflates 1.0 mg. of the tris(hydroxymethyl)aminomethane salt of N,N'-(4-cyano-m-phenylene)dioxamic acid. Four hours later the individual insufflates 0.01 mg. of the same compound and every 4 to 6 hours thereafter insufflates 0.01 mg. of the same compound until effective asthma prophylaxis is not provided. The individual then insufflates 1.0 mg. of the same compound, then reduces the insufflation dosage to 0.01 mg. 4 to 6 hours later. The dosage schedule continues in this manner.

The administration of the compositions of the present invention to humans and animals provides a method for the prophylactic treatment of allergy or all anaphylactic reactions of a reagin or a non-reagin mediated nature. That is to say these compositions, when administered to a sensitized individual prior to the time that the individual comes into contact with substances (antigens) to which he is allergic, will prevent the allergic reaction which would otherwise occur.

For example, the process can be used for prophylactic treatment of such chronic conditions as bronchial asthma, allergic rhinitis, food allergy, hay fever, urticaria, auto-immune diseases, exercise induced asthma, stress induced asthma, and bird fancier's disease.

Example 3

A lot of 10,000 tablets, each containing 20 mg. of N,N'-(4-cyano-m-phenylene)dioxamic acid is prepared from the following types and amounts of ingredients:

| | |
|---|---|
| N,N'-(4-Cyano-m-phenylene)- dioxamic acid, micronized | 200 Gm. |
| Dicalcium phosphate | 1,000 Gm. |
| Methylcellulose, U.S.P. (15 cps) | 60 Gm. |
| Talc | 150 Gm. |
| Corn starch | 200 Gm. |
| Magnesium stearate | 12 Gm. |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and magnesium stearate, and compressed into tablets.

These tablets are useful in preventing hay fever attacks at a dose of 1 tablet every 4 to 6 hours.

Example 4

One thousand two-piece hard gelatin capsules, each containing 20 mg. of N,N'-(4-cyano-m-phenylene)-dioxamic acid are prepared from the following types and amounts of ingredients:

| | |
|---|---|
| N,N'-(4-Cyano-m-phenylene)- dioxamic acid | 20 Gm. |
| Talc | 150 Gm. |
| Magnesium stearate | 1 Gm. |

The ingredients are mixed well and filled into capsules of the proper size.

Capsules so prepared are useful in preventing attacks of bronchial asthma at a dose of one capsule every 4 to 6 hours.

Example 5

One thousand tablets, each containing 30 mg. of N,N'-(2-cyano-p-phenylene)dioxamic acid are prepared from the following types and amounts of ingredients:

| | |
|---|---|
| N,N'-(2-Cyano-p-phenylene)- dioxamic acid | 30 Gm. |
| Microcrystalline cellulose NF | 410 Gm. |
| Starch | 100 Gm. |
| Magnesium stearate powder | 3 Gm. |

The ingredients are screened and blended together and pressed into 543 mg. tablets.

The tablets are useful to protect against food allergy at a dose of 1 tablet before meals.

Example 6

A sterile preparation suitable for intramuscular injection and containing 2 mg. of N,N'-(4-cyano-m-phenylene)dioxamic acid in each milliliter is prepared from the following ingredients:

| | |
|---|---|
| N,N'-(4-Cyano-m-phenylene)- dioxamic acid | 2 Gm. |
| Benzyl benzoate | 200 ml. |
| Methylparaben | 1.5 Gm. |
| Propylparaben | 0.5 Gm. |
| Cottonseed oil q.s. | 1,000 ml. |

One milliliter of this sterile preparation is injected for prophylactic treatment of allergic rhinitis.

Example 7

Six hundred ml. of an aqueous solution containing 4.0 mg. of the tris(hydroxymethyl)aminomethane (THAM) salt of N,N'-(4-Cyano-m-phenylene)dioxamic acid per ml. is prepared as follows:

| | |
|---|---|
| Tris(hydroxymethyl)aminomethane) (THAM) salt of N,N'-(4-cyano-m-phenylene)dioxamic acid | 2.4 Gm. |
| Sodium chloride | 5 Gm. |
| Water for injection q.s. | 600 ml. |

The THAM salt and sodium chloride are dissolved in sufficient water to make 600 ml. and sterile filtered.

The solution is placed in nebulizers designed to deliver 0.25 ml. of solution per spray.

The solution is inhaled into the lungs every 4 to 6 hours for prevention of asthmatic attacks.

Example 8

A powder mixture consisting of 0.1 gram of tris(hydroxymethyl)aminomethane salt of N,N'-(2-cyano-p- phenylene)dioxamic acid and sufficient lactose to make 5 grams of mixture is micropulverized and placed in an insufflator designed to deliver 50 mg. of powder per dose.

The powder is inhaled into the lungs every 4 to 6 hours for prevention of asthmatic attacks.

The powder is inhaled intranasally every four hours for prevention of rhinitis.

Example 9

Twelve grams of an aerosol composition are prepared from the following ingredients:

| | |
|---|---|
| Tris(hydroxymethyl)aminomethane salt of N,N'-(4-cyano-m-phenylene)dioxamic acid | 0.50 Gm. |
| Freon 12 | 1.440 Gm. |
| Freon 114 | 2.160 Gm. |
| Water | 7.300 Gm. |
| Sorbitan monoleate | 0.600 Gm. |

The THAM salt is dissolved in the water and combined with the other constituents under pressure. The twelve grams of composition are added to a 13 cc. plastic coated bottle and capped with a metering valve. The metering valve releases 80 mg. of composition in an aerosol. The aerosol is inhaled every 4 to 6 hours for prevention of asthmatic attacks.

Example 10

In individuals who require continual treatment in the Examples 3 through 9, the dosage of the Example is given initially and each succeeding administration of the drug is at 1/50 of the initial dosage. This maintenance dosing is continued until effective allergy prophylaxis is not obtained. The initial dosage of Examples 3 through 9 is then started once more, followed by the maintenance dosages.

Example 11

After allowing for the differing solubilities of the compounds and the activity of the particular compound as measured, for example, by the in vivo rat passive cutaneous anaphylaxis assay, a suitable quantity of each of the compounds of Table I and Table II are substituted for the active compound in the compositions and uses of Examples 3 through 9. Results showing antiallergy activity are obtained.

Example 12

The rat passive cutaneous anaphylaxis assay is run in the following manner:

Female Sprague-Dawley 250 gm. rats are skin-sensitized with rat anti-ovalbumin homocytotropic antibody that is heat labile and has a passive cutaneous anaphylaxis titer of 1:128. After a 72-hour latency period, the animals are challenged i.v. with 4 mg. ovalbumin (OA) + 5 mg. Evans blue dye and the test compound. Thirty minutes later the extravascular bluing that results from antigen antibody combination at the skin side is read. Antibody dilutions are used such that in control animals a 4 mm spot is the lowest detectable spot, and 4 or 5 lower dilutions are used to give a range of antibody in each animal. Four to five animals are used for each variable in the experiment. Percent inhibition of the PCA assay is calculated by comparing the spot scores of treated rats with the spot scores of control rats. The spot score is the total number of detectable spots over the number of animals.

The tris(hydroxymethyl)aminomethane salt of N,N'-(4-cyano-m-phenylene)dioxamic acid is prepared by dissolving the dicarboxylic acid in an equivalent weight of aqueous tris(hydroxymethyl)aminomethane and is tested in the rat passive cutaneous anaphylaxis assay in the above manner.

The inhibitory dose$_{50}$ for the tris(hydroxymethyl)aminomethane salt of N,N'-(4-cyano-m-phenylene)dioxamic acid is 0.10 mg./kg.

Additional preferred specific compounds in accordance with this invention are N,N'-(4,6-dicyano-m-phenylene)-dioxamic acid, N,N'-(2-cyano-m-phenylene)dioxamic acid, and N,N'-(2,5-dicyano-m-phenylene)dioxamic acid. The 4,6-dicyano compound is prepared in the following manner. 1,3-dichloro-4,6-dinitrobenzene is reacted with an excess of cuprous cyanide in dimethylformamide at reflux temperature to give the 1,3-dicyano-4,6-dinitrobenzene. This compound, isolated by pouring the cooled reaction mixture into water and filtering, is then reduced to the diamino analogue by treatment with stannous chloride in hydrochloric acid. This diamino compound is reacted with ethyl oxalyl chloride in the manner earlier described in this application and then hydrolyzed to form N,N'-(4,6-dicyano-m-phenylene)dioxamic acid. Starting with 4-chloro-3,5-dinitrobenzonitrile, and in a similar manner as before, that is reacting the chlorobenzonitrile with cuprous cyanide and reducing the resulting dicyano-dinitro compound to the diamino analogue, N,N'-(2,5-dicyano-m-phenylene)dioxamic acid is prepared. Starting with the 2,6-dinitrobenzonitrile, N,N'-(2-cyano-m-phenylene)dioxamic acid is prepared.

I claim:

1. A compound of the formula

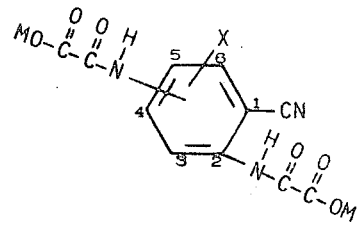

wherein M is selected from the group consisting of hydrogen and a pharmaceutically acceptable metal or an amine cation and

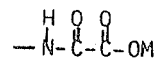

is at one of the positions 4,5 and 6 with the proviso that when

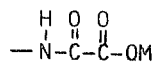

is at 4, then when X is at the three position, X is selected from the group consisting of hydrogen and alkyl from one to three carbon atoms, inclusive;

when X is at the 5 position, X is selected from the group consisting of hydrogen, halogen, alkoxy from one to three carbon atoms, inclusive, and cyano; and when X is at the 6 position, X is selected from the group consisting of hydrogen and halogen;

5, then when X is at the 3 or 6 position, X is hydrogen; and when X is at the 4 position, X is selected from the group consisting of hydrogen, halogen, alkyl from one to three carbon atoms, inclusive; and alkoxy from one to three carbon atoms, inclusive;

6, when X is at the 3 or 5 position, X is selected from the group consisting of hydrogen and alkyl from one or three carbon atoms, inclusive; and when X is at the 4 position, X is selected from the group consisting of hydrogen alkyl from one to three carbon atoms, inclusive, and cyano.

2. A compound in accordance with claim 1 wherein M is hydrogen or tris(hydroxymethyl)methylammonium,

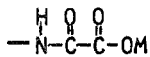

is at the 4 or 5 position, and X is hydrogen.

3. A compound in accordance with claim 2 wherein

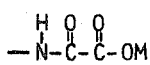

is at the 4 position.

4. A compound in accordance with claim 3 wherein

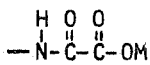

is at the 5 position.

5. A compound in accordance with claim 1 wherein M is hydrogen,

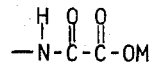

is at the 6 position and X is hydrogen.

6. A compound in accordance with claim 1 wherein M is hydrogen,

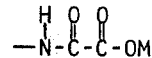

is at the 6 position and X is 4-cyano.

7. A compound in accordance with claim 1 wherein M is hydrogen,

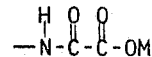

is at the 4 position and X is 5-cyano.

* * * * *